April 20, 1954 M. F. HASLER ET AL 2,675,734
SPECTROCHEMICAL ANALYSIS SYSTEM
Filed Sept. 27, 1949 5 Sheets-Sheet 1

MAURICE F. HASLER ROLAND W. LINDHURST
DONALD R. PROCTOR, JOSEPH WESLEY KEMP
INVENTORS:

BY
ATTORNEY.

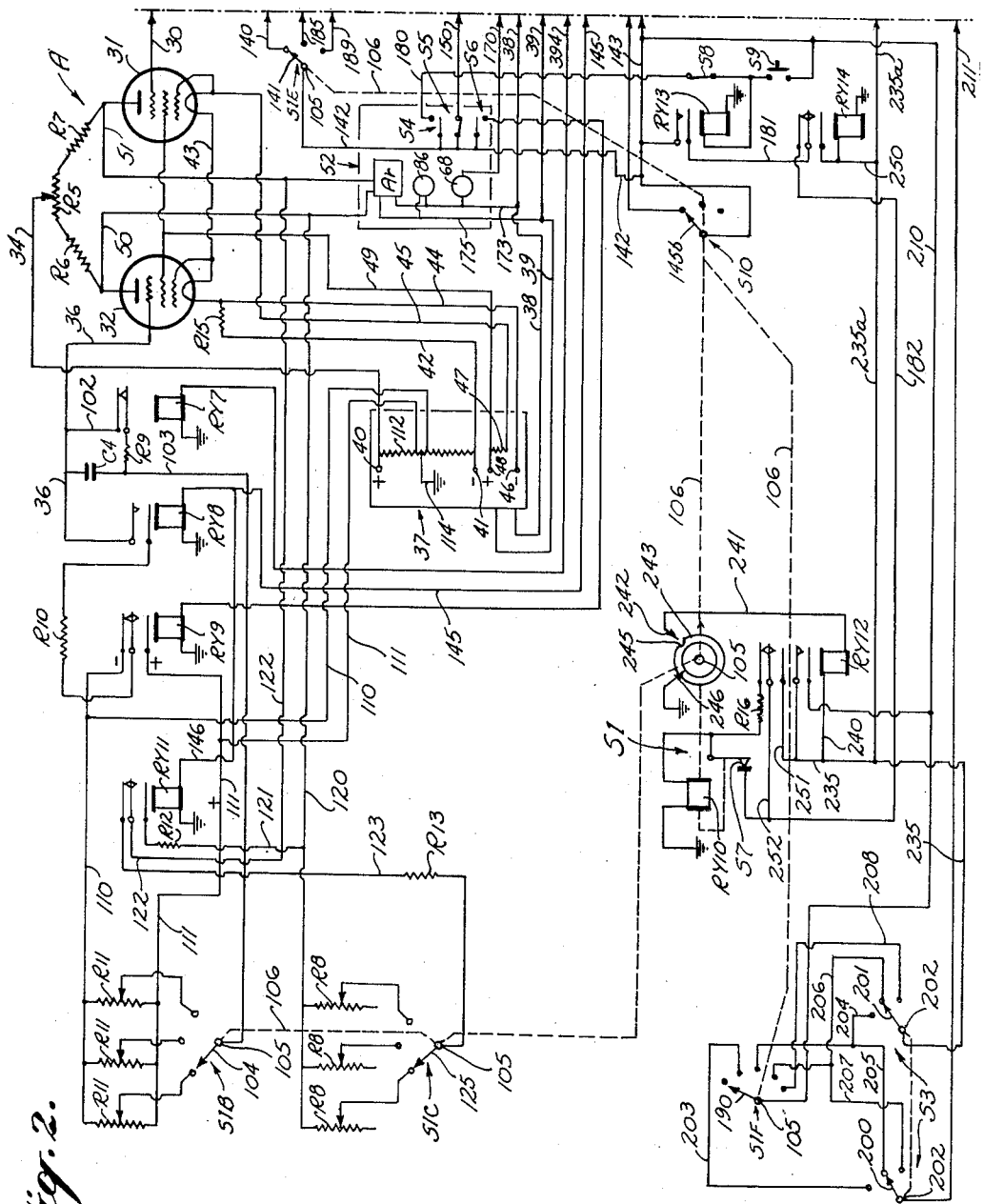

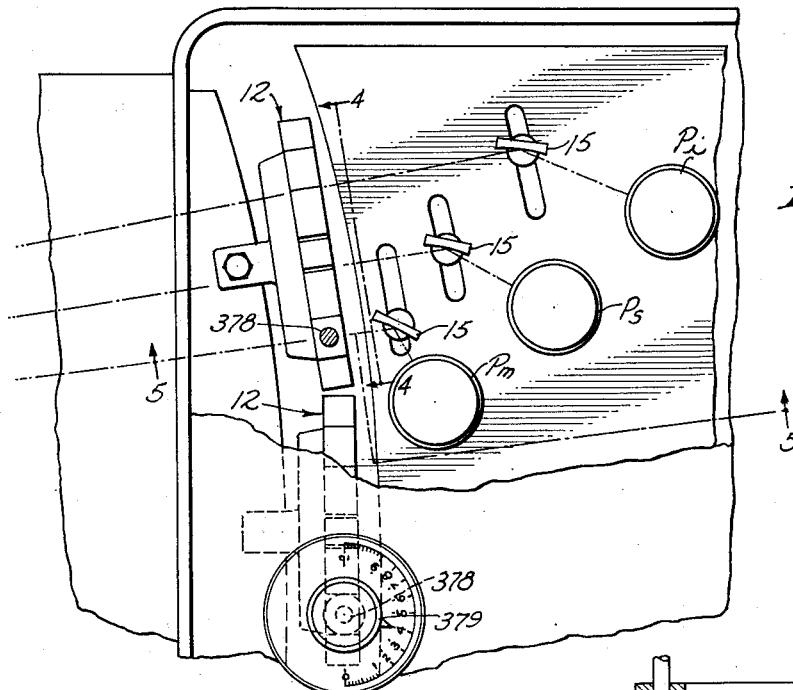
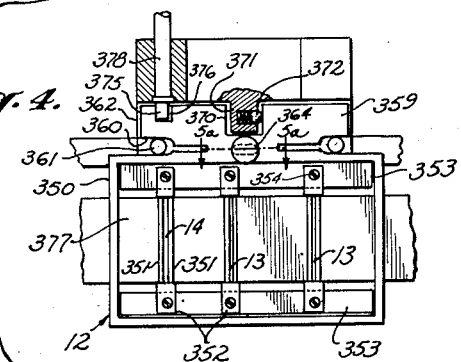
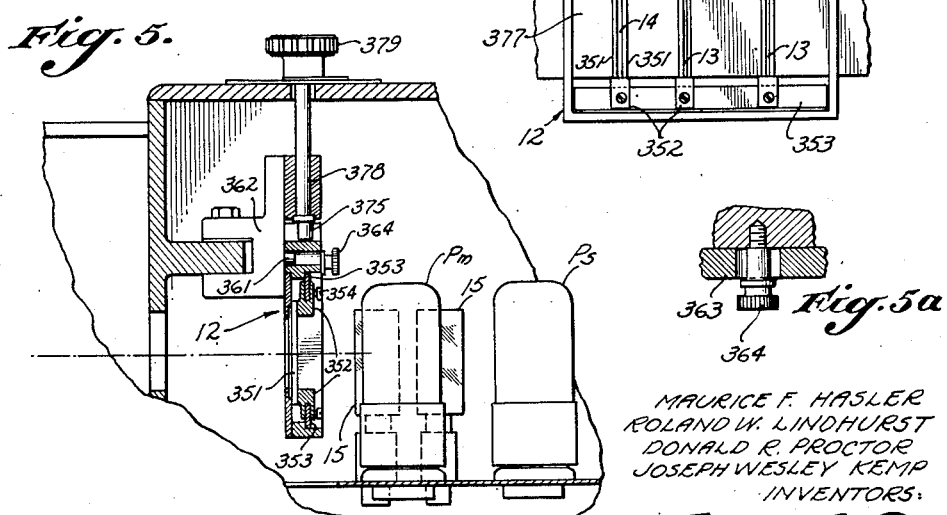

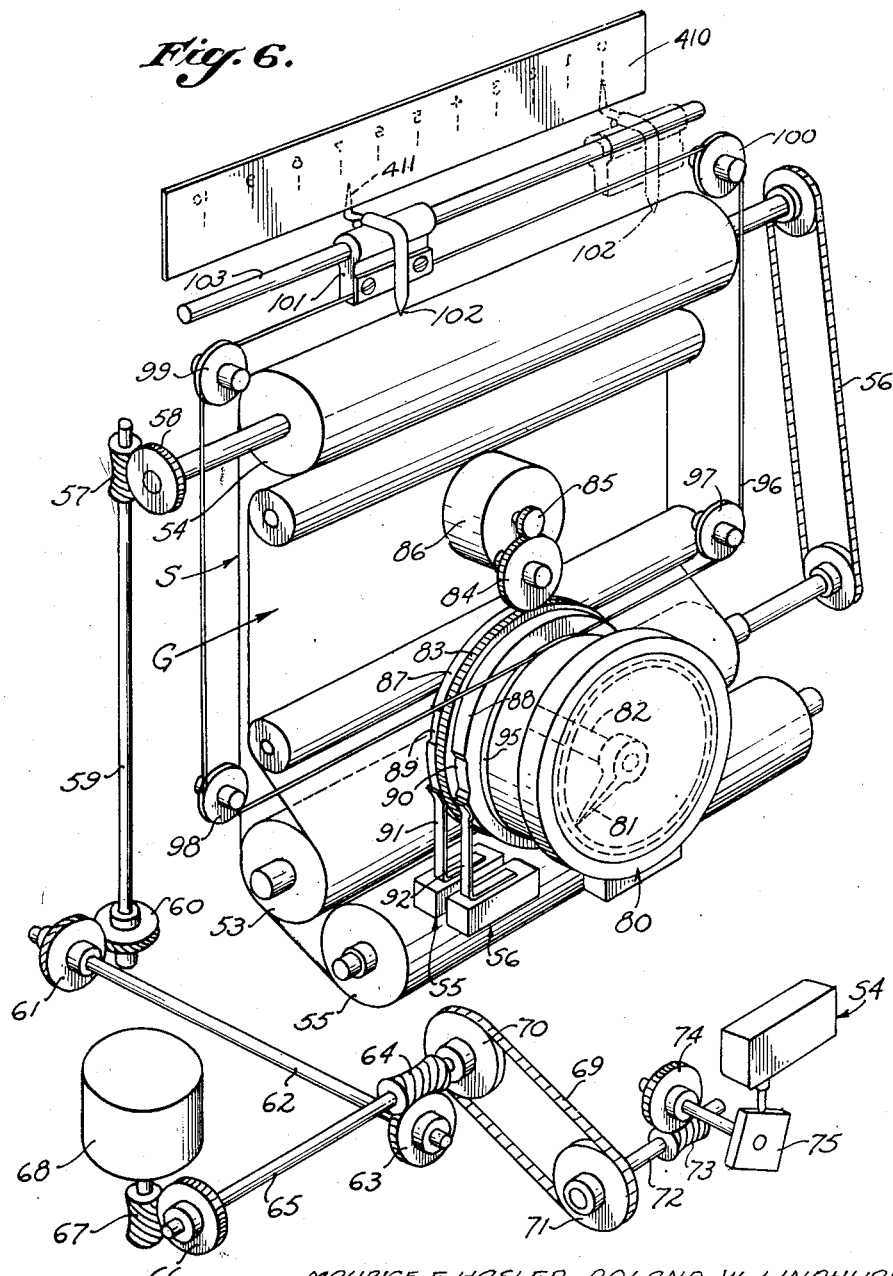

April 20, 1954 M. F. HASLER ET AL 2,675,734
SPECTROCHEMICAL ANALYSIS SYSTEM
Filed Sept. 27, 1949 5 Sheets-Sheet 5
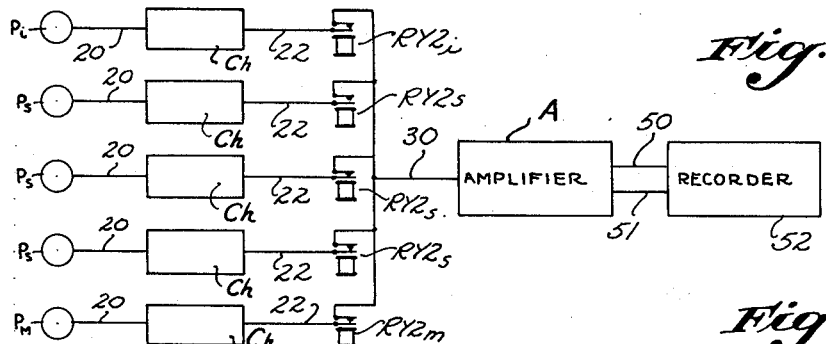
*Fig. 9.*
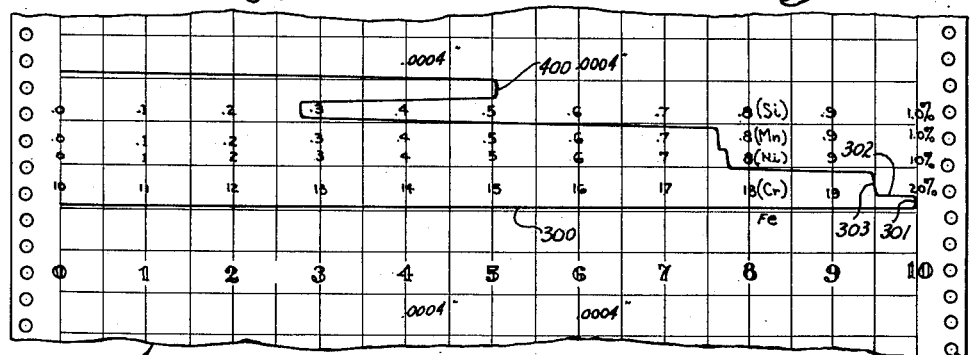
*Fig. 7.*
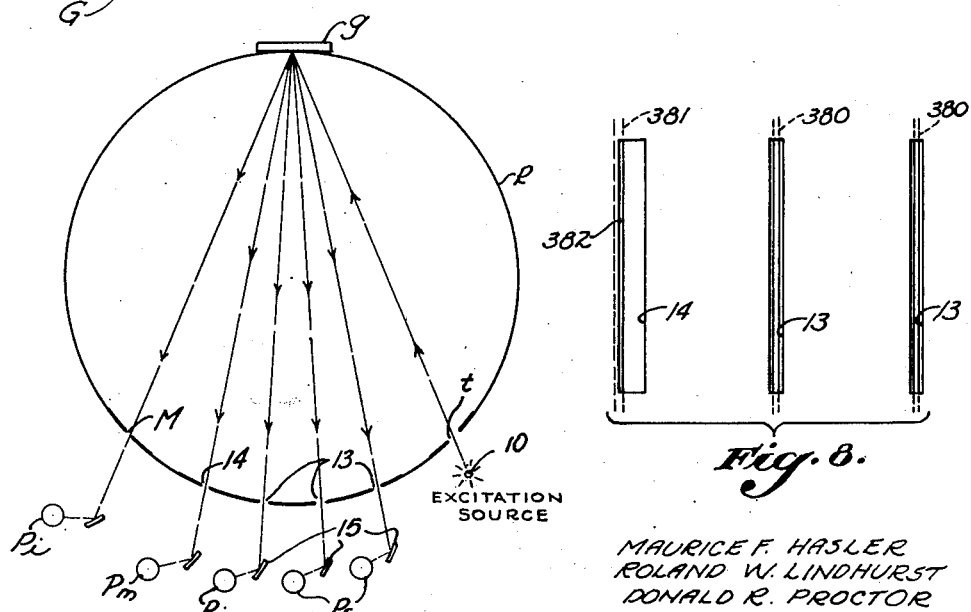
*Fig. 8.*
*Fig. 10.*
MAURICE F. HASLER
ROLAND W. LINDHURST
DONALD R. PROCTOR
JOSEPH WESLEY KEMP
INVENTORS
BY
ATTORNEY Patented Apr. 20, 1954

2,675,734

UNITED STATES PATENT OFFICE 2,675,734

SPECTROCHEMICAL ANALYSIS SYSTEM

Maurice F. Hasler and Donald R. Proctor, Glendale, Joseph Wesley Kemp, Los Angeles, and Roland W. Lindhurst, Glendale, Calif., assignors to Applied Research Laboratories, a corporation of California Application September 27, 1949, Serial No. 118,124

25 Claims. (Cl. 88—14)

This invention relates generally to emission spectrochemical analysis methods and apparatus, particularly of a type adapted to integrate spectrum line intensities and furnish an automatic recording of integrated line intensity ratios on concentration scales of various elements, so as to give direct-reading spectrochemical analyses. The invention will be hereinafter described in a specific illustrative form using electromagnetic radiations emitted from the sample of material by subjecting it to an electric spark or arc, i. e., of frequencies within the visible spectrum and known as "light."

In perhaps the commonest form of emission spectrochemical analysis as heretofore known, a sample of the material to be analyzed is excited by subjecting it to an electric spark or arc, and a beam of the radiant energy so generated is dispersed by a prism or grating to form a spectrum, in which certain bright lines indicate the presence of particular elements, with the line intensities indicating the percentages or proportions of the elements present. The spectrum is sometimes recorded photographically, and in other cases the lines are reflected to a phototube and brought to an indication by direct reading equipment associated therewith. The direct reading equipment may comprise means for integrating the line intensities over a given time period, and for rendering an integrated reading at the termination of such period.

General objects of the present invention include the provision of improved direct reading methods and apparatus, including improved means for automatically making a recording of integrated line intensity ratios following a run on a sample of material. Further and more particular objects will appear in the course of the ensuing description.

In carrying out the present invention in an illustrative embodiment, a conventional spectrograph may be employed, of a type which forms a spectrum along a focal curve or "Rowland Circle." An array of receiver slits is positioned along this Rowland Circle to segregate a number of spectral lines from the spectrum. The light passing through each of these slits is made to fall on a narrow mirror which reflects it onto a detecting device, illustratively a multiplier-phototube. Groups of these slits covering a small region of the spectrum are mounted on a single slit holder frame which can be moved along the spectrum a small distance. This allows profiling of any spectrum line and positioning of a group of slits in such a manner that all the light of each line passes through the corresponding slit and reaches the proper phototube. In this manner motion of the spectrum with regard to the spectrum base, or relative motion between slit groups, such as may be due to temperature change, vibration, or aging effects in the equipment, may be compensated.

With light from a particular line reaching each phototube, the next step is to integrate all the light received over a major portion of the sample excitation cycle. According to the present invention, this is accomplished by having each phototube charge a highly insulated condenser during a time period occupying a major portion of the excitation cycle. The condenser associated with each phototube and spectral line is arranged for connection to an ultra-high-impedance amplifier and measurement or recording system (preferably a pen recording system operating on a strip chart). In the present illustrative embodiment of the invention, one of the condensers, associated with a phototube receiving light from an internal standard spectral line, is connected to this amplifier during the charging period, so that the amplifier follows the charging, and this continues until a predetermined value of charge is attained by this condenser. The recorder then actuates a microswitch which terminates the excitation source for the sample and ends the integration on all condensers. This feature has certain advantages, as will later appear, though it is not indispensible, since the charging period can simply be terminated after a predetermined time interval, as should be evident. Automatically the amplifier and recorder are then switched from condenser to condenser, and the charge on each is recorded in sequence. Assuming the preferred pen type of recorder, this may be done on special strip chart paper printed with concentration scales for each element. These charts then provide a permanent direct reading record of the concentration of each element analyzed in the sample.

Features of the invention include the provision, in connection with each integrator unit, of zero and sensitivity controls, which have several uses. By providing two condensers in each integrator unit and by storing the analysis of a low standard in one and a high standard in the other, the amplifier can be switched back and forth between the two condensers and the zero and sensitivity controls adjusted so that the concentration scale exactly fits the standards. The zero control is also valuable for shifting the portion of the concentration scale to be used as the response from the optical background and the lower concentrations not required can be moved off the scale of the recorder.

The invention includes as another feature an automatic zero control which automatically compensates for any zero drift in the amplifier, thus relieving the operator of any attention to this detail.

The invention will be described with reference to the accompanying drawings showing a present illustrative embodiment thereof, and wherein:

Figures 1 and 2, taken together, show a schematic wiring diagram of a system in accordance with the invention;

Figure 3 is a fragmentary plan view of a portion of the slit system employed in the invention;

Figure 4 is a detailed section taken in accordance with line 4—4 of Figure 3;

Figure 5 is a section taken on broken line 5—5 of Figure 3;

Figure 5a is a detail taken on line 5a—5a of Figure 4;

Figure 6 is a diagrammatic perspective view of a strip chart recorder employed in the invention;

Figure 7 shows a portion of a strip chart recording made in accordance with the invention;

Figure 8 is a diagrammatic view showing, to exaggerated scale, certain slits employed in the invention;

Figure 9 is a schematic diagram of the system of Figures 1 and 2; and

Figure 10 is a schematic diagram of the source unit, grating, and focal plane of a spectrograph.

Figure 1:
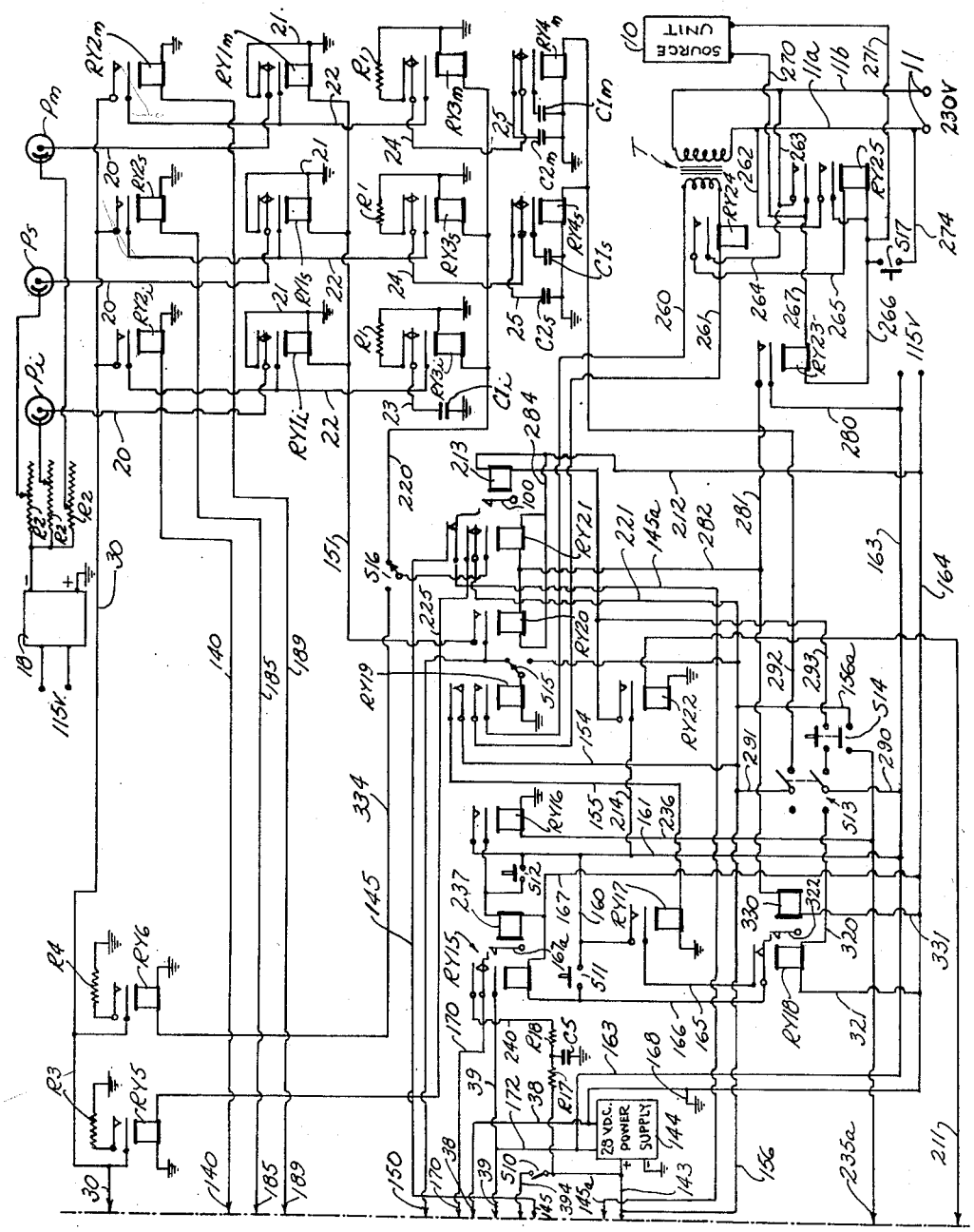

In the drawings showing one illustrative embodiment of the invention (see Figures 1, 2, 9 and 10), a conventional source unit is indicated diagrammatically at 10, and it will be understood that this unit is adapted to be energized through presently described circuiting from power mains 11 (typically 230 volts), and to produce an electric spark or arc to excite the sample to be analyzed. For a preferred source unit, see United States Patent No. 2,417,489. It will be understood that, in accordance with standard practice, the radiant energy from the excited sample is utilized to illuminate a slit, and that a beam of light from the illuminated slit is dispersed by a grating and brought to a focus in the form of a spectrum extending along a focal curve or "Rowland Circle." Such equipment is conventional and need not be detailed herein. For a reference to a typical system, see United States Patent No. 2,420,077.

Along the focal curve are placed groups of slit assemblies such as indicated at 12 in Figures 3-5. The details of these assemblies will be described hereinafter, and it will suffice for the present to state that each slit group provides a plurality of closely grouped individual slits 13, each slit being individually adjustable along the focal curve. It will be understood that these slits are positioned to aline with bright lines of the spectrum, the width of each slit 13 being greater than the width of a spectral line, and the slits being so centered that the whole of each line shows through the slot. Assuming spectral lines of .002" in width, the slits 13 are typically made .006" in width. In addition, each slit group includes one monitor slit 14 of somewhat greater width, e. g., .012", and in this case, the spectral line is centered with respect to one edge of the slit.

Behind the slits are positioned narrow concave cylindrical mirrors 15 (Fig. 3) adapted to reflect the light passed through the slits to multiplier phototubes $P_i$, $P_s$ and $P_m$, the mirrors imaging the slits at the phototubes.

One phototube $P_i$ is associated with an internal standard line. For example, assuming an analysis of stainless steel, a relatively strong iron line of the spectrum may be selected for the purpose of the internal standard, and the corresponding phototube will be designated as $P_i$. Alternatively, the primary reflected beam may be taken as the internal standard, as will be explained hereinafter. There may be a multiplicity of phototubes $P_s$, one for each spectral line of interest. For simplicity, only one such phototube $P_s$ is indicated in Figures 1 and 2, but it will be understood that this illustrated phototube $P_s$ is representative of a multiplicity of such tubes, and that the circuiting and selector switch positions to be described for the single illustrated phototube $P_s$ will be duplicated for each additional phototube $P_s$ that would be employed in an actual practical case. Such a plurality of phototube $P_s$ is indicated in the schematic diagram of Figure 9, which is representative of the same system as Figures 1 and 2, but includes the additional phototubes $P_s$ and associated channels leading to amplifier input lead 30, the equipment of each channel between the phototube and relay RY2 being indicated by the block $Ch$. Finally, there is a single monitoring phototube $P_m$, receiving light from the monitor slit 14.

For convenience, the phototubes will hereinafter be referred to collectively as phototubes P, while in any instance in which there is the necessity for differentiating between the different phototubes, they will be referred to as $P_i$, $P_s$ or $P_m$, as the case may be. The same convention will be employed for certain later described condensers C and relays RY.

The direct current power supply unit for the phototubes is conventionally indicated at 18, supplied with 115-volts alternating current. For simplicity the phototubes are shown as simple phototubes, though it will be understood that in practice multiplier phototubes will be used to secure necessary output. Thus, as shown, the negative terminal of the power supply unit is connected through sensitivity control resistors R2 to the cathodes of phototubes $P_i$, $P_s$ and $P_m$. The anodes of the phototubes $P_i$, $P_s$ and $P_m$ are connected through suitable relays to highly insulated storage condensers $C1_i$, $C1_s$ and $C1_m$, respectively. Leads 20 from the anodes of the phototubes are connected to the movable contacts of phototube relays $RY1_i$, $RY1_s$ and $RY1_m$, and these contacts are normally closed against relay contacts grounded by leads 21, as shown. When these relays are energized, their movable contacts close with contacts connected by leads 22 to the stationary contacts of condenser grounding relays $RY3_i$, $RY3_s$ and $RY3_m$. The movable contacts of these relays normally close with stationary contacts connected through resistors R1 to ground. The movable contact of relay $RY3_i$ is connected by lead 23 to the condenser $C1_i$, while the movable contacts of relays $RY3_s$ and $RY3_m$ are connected by leads 24 to the movable contacts of relays $RY4_s$ and $RY4_m$. When the latter relays are energized, which is their normal condition, their movable contacts close with contacts connected to condensers $C1_s$ and $C1_m$, the other sides of which are grounded, as indicated. The movable contacts of relays $RY4_s$ and $RY4_m$ close, when the relays are de-energized, with contacts connected by leads 25 to condensers $C2_s$ and $C2_m$, and the other side of these condensers are also electrically grounded. Leads 22 also connect to the stationary contacts of relays $RY2_i$, $RY2_s$ and $RY2_m$, and the movable contacts of the latter are connected to a common lead 30. Each phototube P with its relays RY1, RY2, RY3 and RY4, condenser C, and associated circuiting, may be referred to as a "channel," and we thus have an internal standard channel receiving the output from $P_i$ and charging up the condenser $CI_i$, one or more sample analysis channels receiving the output from phototube $P_s$ and charging up condenser $CI_s$, and a monitor channel receiving the output from phototube $P_m$ and charging up the condenser $C_m$.

The lead 30 from relays RY2 goes to the input terminal of a voltage amplifier A of ultra high input impedance, such as will not preceptibly discharge the storage condensers. This amplifier may be of various types, but there is here shown an ultra-high impedance amplifier of the bridge type. Accordingly, the lead 30 is connected to the control grid of thermionic amplifier tube 31 forming one arm of the bridge amplifier circuit. A second amplifier tube 32 forms a second arm of the bridge, and the anodes of these vacuum tubes 31 and 32 are connected to the bridge arms R6 and R7, said arms consisting of resistors, as indicated; and preferably, for fine adjustment, a resistor R5 is inserted between resistor R6 and R7, and the bridge power lead 34 is connected to an intermediate point on resistor R5 by a variable tap. While various tubes may be employed for the purpose of amplifier tubes 31 and 32, an RCA Pentode No. 959, "electrometer connected," has been found suitable to the purpose. By electrometer connected is meant that the tube element ordinarily employed for the suppressor grid is used as the control grid, and the element serving normally as the control grid is tied directly to the filament. Accordingly, amplifier input lead 30 is connected to the tube element serving as the control grid for tube 31. The control grid for tube 32 is connected to a zero control lead 36, referred to in more particularly hereinafter.

An amplifier power supply unit 37, to which are connected 115-volt input leads 38 and 39, provides a direct current voltage, such as 95-volts, between its positive and negative terminals 40 and 41, and the aforementioned amplifier lead 34 is connected to positive terminal 40. Negative power supply terminal 41 is connected by lead 42 through voltage dropping resistor R15 to the cathode of one of tubes 31 and 32, which cathodes are series connected by lead 43. The two series connected cathodes are supplied with heating current through leads 44 and 45, the former of which is connected to negative 20-volt power supply terminal 46, and the latter of which is connected through voltage dropping resistor 47 to positive 20-volt power supply terminal 48. Positive 20-volt terminal 48 is also connected by lead 49 to the screen grids of tubes 31 and 32.

Voltage dropping resistor R15 is of such value as to result in the application of a D. C. voltage of about 25 volts across the power input terminals of the bridge, i. e., between the cathodes of the two tubes and the center point between resistor arms R6 and R7. Voltage dropping resistor 47 lowers the 20 volt supply voltage to about 2.5 volts, so as to furnish each cathode with 1.25-volts.

Amplifier output leads 50 and 51 are connected across the bridge, between the resistors R6 and R7 and the adjacent amplifier tubes, as indicated, and these leads 50 and 51 go to the input terminals of a measuring instrument, preferably a recorder unit 52. While various types of recorders may be employed, within the broad scope of the invention, that preferably used is of a well-known type adapted to respond in accordance with voltage input, and to make a recording of voltage input on strip chart paper. A suitable recorder for the purpose is Leeds and Northup 0–50 millivolt-Speedomax type G strip chart recorder, and a recorder of this type is diagrammatically indicated in Figure 6 of the drawings. Such a recorder drives strip chart paper G from lower supply roller 53 between rollers such as indicated up and over upper roller 54, where it is engaged by the recording element, conventionally a pen, and then down and under roller 53 to be rolled up by take-up roller 55. The shafts of the rollers 43 and 54 are chained together as indicated at 56, and the shaft of the upper roller is driven through a worm 57 and worm wheel 58 from a shaft 59 driven in turn through spiral gears 60 and 61 from shaft 62. The latter is driven through worm wheel 63 and worm 64 from shaft 65 carrying worm wheel 66 driven by worm 67 on the shaft of strip chart drive motor 68. Drivingly connected to the shaft 65, as by chain 69 and sprockets 70 and 71, is a shaft 72 connected by worm 73 and worm wheel 74 to a shaft bearing a cam 75 adapted periodically to actuate recorder microswitch S4. It will be seen that this microswitch will be actuated repeatedly as the strip chart G is advanced by motor 68, the actuations occurring for example with each ¼" advance of the chart. The complete mechanism and circuiting of the strip chart recorder will not be described herein, since, as already mentioned, the details of such recorders are well known. However, the previously mentioned slide wire potentiometer is incorporated on a drum 80 whose movable contact arm 81 is carried on a shaft 82, this shaft carrying a large gear 83 driven through smaller gears 84 and 85 from drive motor 86. In accordance with the invention, shaft 82 is provided, on opposite sides of gear 83, with cam disks 87 and 88 having switch actuating notches 89 and 90, respectively, which coact with the movable arms 91 and 92 of microswitches S5 and S6. A pulley 95 fixed on shaft 82 has wound thereon a cord 96 passing over four idler pulleys 97, 98, 99 and 100, and the stretch of cord between pulleys 99 and 100 extends parallel with the upper chart strip roller 54, and has secured thereto the movable pen unit 101 which carries pen 102 transversely across the strip chart paper on roller 54 to make an ink line thereon and thus record the position of the unit 101. As shown, the unit 101 is guided on a transverse rod 103. When the pen unit reaches its zero position (indicated in dotted lines in Figures 6), the notch 90 in drum 88 comes opposite actuating arm 92 for normally open microswitch S6, closing the same. Notch 90 is made sufficiently long that microswitch S6 will remain closed for some degree of over-travel of the recorder pen below its zero position. As the pen moves toward the high end of the scale, the switch drums rotate clockwise, as viewed in Figure 6, through a little less than 360°, until notch 89 in drum 87 reaches the operating arm 91 for normally closed microswitch S5, and opens the said switch.

Manually adjustable zero controls are provided for the amplifier, as well as an automatic zero control or drift correction circuit which is operative, prior to making a "run" on a sample, to maintain the amplifier normally at zero output (in balance). Connected to the aforementioned lead 36 going to the control grid of amplifier tube 32 is a lead 102 forming a circuit through the contacts of a relay RY7 and thence to a high resistance R9 (of the order of 1,000 ohms), beyond which is lead 103 connecting to the wiper arm 104 of the deck switch S1B of a multi-level rotary solenoid operated stepping selector switch S1. The various later mentioned wiper arms at the different levels or decks of this stepping switch S1 are to be understood as operated by a single shaft 105, adapted to be pulsed or ratcheted ahead, step by step, by successive energizations of the rotary solenoid RY10. In the drawings, the various levels of this stepping relay are linked together by the dash-line 106, representing the fact that they are all operated by the common shaft 105. Returning to wiper arm 104 of S1B, said arm is adapted to close successively with a plurality of switch contacts connected to the variable arms or taps of potentiometer resistors R11, of which there is one corresponding to each phototube. Opposite ends of these resistors R11 are connected to leads 110 and 111, and the latter lead to power supply unit 37, where they connect with spaced points on a potentiometer resistor 112 connected between the positive and negative D. C. terminals 40 and 41. It will be recalled that the voltage across terminals 40 and 41 is 95 volts. The two leads 110 and 111 are connected to resistor 112 at points approximately 10 volts apart, with the more negative lead 110 at about 50 volts positive with respect to negative terminal 41. Resistor 112 is grounded, as indicated at 114, at an approximate central point, in this instance at 55 volts positive with respect to negative terminal 41, or in other words, half way between the two leads 110 and 111.

A condenser C4 is connected between amplifier input lead 36 and lead 103, going therefore across shorting resistor R9 and the contacts of relay RY7. It may now be seen that, with relay RY7 de-energized, and therefore closed, a voltage between the variable tap of R11 and ground will be applied by way of lead 103, resistor R9, lead 102 and lead 36 to the control grid of amplifier tube 32. It will also be evident that at this time no voltage exists across condenser C4. By adjustment of zero control resistor R11 the voltage so applied to the grid of tube 32 may be made such as to give zero output voltage between wires 50, 51 leading to the recorder which will cause the latter to give a zero deflection reading.

The two 10-volt power-leads 110 and 111, of negative and positive polarity, respectively, are connected to the two stationary contacts of a relay RY9, the movable contact of which is normally closed with the stationary contact to which is connected the negative lead 110. The movable contact of this relay RY9 is connected through a very high resistor R10, of the order of 1,000 megohms, to the stationary contact of a relay RY8. The movable contact of the latter relay is connected to control grid lead 36.

It will be recalled that pen recorder 42 contains a "zero switch" S6, which is open at all times that the recorder pen is above the zero position, but which is closed at the zero position and below. Accordingly, when the recorder pen registers zero, or goes off scale below zero, switch S6 will be closed, and said switch will be open at any recorder pen position above zero. In the reset and ready-to-operate condition of the system, relay RY8 is energized and closed by later described circuiting, connecting the movable contact of relay RY9 via the high resistance R10 to condenser C4. Voltage across this condenser is continuously applied by lead 36 to the control grid of tube 32. At this time the recorder pen should register zero, but will tend to drift slightly above or below. At zero or below, switch S6 is closed, and acts to energize relay RY9, closing the movable relay contact with the stationary contact connected to positive lead 111, thereby causing the condenser C4 to charge and the control grid of tube 32 to go slightly more positive. This action slightly increases the positive output of the amplifier, and accordingly causes the recorder pen to increase its reading. When the recorder pen moves slightly above zero, switch S6 opens, de-energizing relay RY9, so that the movable contact of the latter closes with negative lead 110, with the result that the condenser C4 slowly discharges and reverses polarity so that the control grid of tube 32 goes negative, the amplifier output goes negative, and the recorder pen returns to zero, or very slightly below.

In this way, at the reset and ready-to-operate position of the system, the recorder pen constantly hunts between a position very slightly above zero and a position very slightly below zero, and does not drift substantially from zero at any time.

It may here be mentioned that while the first position resistor R11 is normally adjusted to establish a zero position for the recorder pen with the amplifier input terminal grounded, other resistors R11 may, if desired, be adjusted to throw the zero position of the pen far off-scale, for a purpose which will appear hereinafter.

With the system at reset and ready-to-operate condition, a high resistance resistor R12, of the order of 5,000 ohms, is connected across the amplifier output leads going to the recorder. This resistor develops a large voltage change across the recorder for a small change in the balanced condition (zero output) of the amplifier, and hence magnifies any tendency for the recorder pen to hunt above and below its zero position. Under these conditions the effectiveness of the above described automatic zero control circuit is maximized.

As shown in the drawings, amplifier output lead 50 has connected thereto lead 120, from which a branch lead 121 goes to one end of the described resistor R12. The other end of this resistor is connected to the lower stationary contact of relay RY11, and the movable contact arm of the latter is connected by lead 122 back to the other amplifier output lead 51. The upper stationary contact arm of relay RY11 is connected by lead 123 containing 250 ohm resistor R13 to the wiper arm 125 of stepping relay RY10. This arm 125 makes successively with contacts connected to the adjustable arms or taps of 1,000 ohm resistors R3, and the latter are connected to the amplifier output lead 120. At reset and ready-to-operate, relay RY11 is energized, and R12 therefore connected across the amplifier output circuit 50, 51 leading to the recorder. In operation, with the source unit energized, the relay RY11 is de-energized by energization of relay RY21, in a manner later to be described, and therefore connects sensitivity control resistor R3, of the order of 1,000 ohms, together with 250 ohm resistor R13, across circuit 50, 51. Adjustment of the resistors RY3 thus adjusts the recorder sensitivity as desired for any given amplifier output current.

Before proceeding further with the detailed circuit connections of the system, particularly those employed to energize the various relays, the general operation of the system may now be described. The relays are all shown in the drawings in their de-energized positions. With the system in the reset and ready-to-operate position, the relays are all in the position shown excepting relays RY4, RY5, RY8, RY11, RY19 and RY24, which are energized and closed, and selector switch S1 is in its first position, as are the subsidiary switches S1A, S1B, etc., which operate with S1. To start an analysis, the operator starts the excitation source unit 10. Through later described circuiting, this operation results in closing RY1, RY3, RY20, RY21, RY23, and RY25. The action of relays RY1 and RY3 connects the phototubes to the corresponding condensers $C1_i$, $C1_s$ and $C1_m$. In the case of condensers $C1_s$ and $C1_m$, the energizing circuit for the condensers includes also the movable and lower stationary contacts of the relays RY4s and RY4m, as will be seen. All phototubes to be used are connected in this way by duplicates of the above circuits when the source unit is started, it being understood that there may be a multiplicity of the phototubes Ps and relay circuits leading to condensers such as $C1_s$.

Also, as the source unit is started, relay RY21 is energized and locked closed by relay lock 100, thereby opening the energizing circuit for relay RY5, causing amplifier input lead 30 to be ungrounded by opening the contacts of relay RY5. Normally, with the system in the reset and ready-to-operate condition, relay RY5 is energized, closing its contacts and thereby grounding the amplifier. Also, as the source unit is started, RY2i is energized, connecting $C1_i$ to amplifier input lead 30. This energization of relay RY2i is effected through a lead 140 connected to the first position contact of a deck switch S1E of stepping switch S1. The wiper arm 141 of this switch S1E is connected by lead 142 to a low voltage direct current power supply lead 143, carrying typically 28 volts, this lead 143 going to a positive terminal of 28-volt direct current power supply unit 144. The operation of relay RY21 also opens lead 145 which has been energizing relay RY8, so that the latter opens, breaking circuit 36 and therefore disconnecting the automatic zero control circuit. The lead 145 that energizes relay RY8 is connected through relay RY21 to lead 145a going to a first position contact of a deck switch S1D of stepping switch S1, the wiper arm 145b of said switch S1D being connected to 28-volt power supply line 143. Thus it will be seen that the automatic zero control circuit can be operative only in the number one position of the stepping switches, and then only prior to energization of relay RY21 which closes the source unit as will be described. At the same time, also by reason of energization of relay RY21, acting through circuit lead 145 and branch lead 146, relay RY11 is de-energized, removing resistor R12 from across the amplifier output circuit and connecting into the circuit 120, 122, and therefore across the amplifier output circuit, the sensitivity control R8 selected by wiper arm 125 of deck switch S1C.

Charging of the condensers $C1_i$, $C1_s$, and $C1_m$ by their respective phototubes then continues until the voltage across the condenser connected to the internal standard phototube Pi has attained a value, which, when amplified, gives a full scale reading on recorder 52, it being recalled that $C1_i$ is not only being charged from its phototube, but is connected through RY2i to the amplifier. It should also be recalled that because of the ultra high impedance of the amplifier A, the voltage developed across the condenser $C1_i$ is utilized without perceptible dissipation of the charge flowing into the condenser. In this connection, it will be evident that the circuits connecting the condensers to the amplifier must be so designed as to avoid dissipating the charges of the condensers. The described circuits connecting the condensers to the amplifier may be characterized as having ultra high or infinite shunt impedance. The time taken to actuate the recorder to full scale deflection can be adjusted by means of the sensitivity control R8 and the attenuator R2. At full scale, the recorder actuates switch S5, the latter, in the present embodiment of the invention, being normally closed, and being opened at the full scale position of the recorder 10. Action of this switch S5 opens relays $RY1_i$, $RY1_s$, and $RY1_m$, thus immediately disconnecting the phototubes from the respective condensers, and at the same time connecting the phototubes to ground. Tracing the circuit connections from switch S5 to relays RY1, the one side of switch S5 is connected via leads 142 and 143 to the 28-volt power supply, while the other side of said switch is connected via lead 150, the contacts of relay RY20 (then closed), and lead 151 to the several relays $RY1_i$, $RY1_s$, and $RY1_m$. Hence, opening of full scale recorder switch S5 instantly de-energizes the said relays, disconnecting the phototubes from the condensers, and connecting them to ground.

Opening of switch S5 also, through lead 150, and switch S15, de-energizes integration termination relay RY19, which in turn, through its several contacts, and later described circuiting, opens relays RY17, RY23, RY24, RY25, and RY20, disconnecting the source unit and so completing the integration termination. It should here be explained that opening of relay RY23 de-energizes relay RY21, its contacts being in the energizing circuit for RY21. Said relay RY21 remains closed, however, until its lock 100 is released, as presently to be described. RY20, upon opening, de-energizes relays RY1, resulting in connecting the phototubes to ground. And the opening of relay RY17 de-energizes chart drive motor relay RY15, though the latter remains locked closed until released by energization of release coil 237.

The de-energization of relay RY19 upon termination of integration closes relay contacts connected to leads 154 and 155, lead 154 being connected to a lead 156 going to the positive terminal of 28-volt power supply unit 144. Lead 155 goes to relay RY17, which is accordingly energized and closed. The movable contact of RY17, then closed with the stationary contact of said relay, is connected via lead 160 to a lead 161 connected in turn to one side 163 of 115-volt alternating current supply line 163, 164. The stationary contact of relay RY17 is connected by way of lead 165, the contacts of normally closed relay RY18, lead 166, relay RY15, and lead 167 to the other side 164 of the 115-volt power line. The power line lead 164 is the neutral side, and is grounded, as indicated at 168.

The described energization of relay RY17 closes the circuit to relay RY15, closing the latter, and thereby closing its movable contact against its lower stationary contact, which results in supplying 115-volt alternating current power to the drive motor 68 of the strip chart recorder. Thus, the movable contact of relay RY15 is connected to lead 170 going directly to recorder chart drive motor 68, while the lower stationary contact of relay RY15 is connected to lead 39 connected in turn via lead 172 to the live side 163 of the 115-volt power line. Relay RY15 is locked closed by relay lock 167a. The neutral side 164 of said power line is connected to previously mentioned lead 38, having branch lead 173 entering the recorder and connecting to the other side of recorder chart drive motor 68, as well as furnishing power to one side of recorder motor 86, and one side of the recorder amplifier $A_r$. In passing, it may be mentioned that the other side of amplifier $A_r$ and the other side of recorder motor 86 are furnished with power from lead 175 connected to live power lead 39. It may now be seen that energization of relay RY15 acts through its movable contact and its lower stationary contact to connect 115-volt power to the chart drive motor 68, which accordingly operates to advance the strip chart.

As the chart drive operates, recorder microswitch S4 is momentarily and repeatedly closed by cam 75, this closure occurring on each quarter-revolution of the latter, applying the 28-volt power from leads 142 and 143 to a lead 180 going through manual switch S8 to the coil of relay RY13, closing the contacts of the latter momentarily to send a 28-volt pulse from lead 142 to lead 181, thence through the movable and upper contacts of then de-energized relay RY14 to a lead 182 which connects to the solenoid RY10 for stepping switch S1. This solenoid RY10 for switch S1 may be of various types, but that preferred is a rotary solenoid stepping switch of the type manufactured by G. H. Leland, Inc., under the trade-mark "Ledex," and comprises a rotary shaft (the aforementioned shaft 105) carrying a plurality of contact arms at different levels along the shaft (such as aforementioned contact arms 104, 125 and 141) for a corresponding plurality of rotary switches, each such contact arm being arranged to sweep or wipe around a circularly arranged set of contacts mounted on disks or "wafers" at the said levels. The shaft is advanced through the angle between contacts by a suitable ratchet mechanism on each energization of a rotary type of solenoid. The switch includes also a normally closed switch in the energizing circuit for its solenoid which is opened just at, or just before, the end of the power stroke of the solenoid. Such a switch is indicated at S7 in Figure 2. The relay also includes a resistor R16 connected in shunt with switch S7, and which carries a reduced current to the solenoid to hold the same temporarily at the forward end of its stroke following the opening of switch S7. Such rotary solenoid stepping switches are well known in the art and hence need not be further described herein. The energizing lead 182 going to this solenoid RY10 is connected thereto through the switch S7, and the resistor R16 is in a shunt circuit with switch S7, which circuit also includes a normally closed pair of contacts of a relay RY12. Thus, the current pulse caused by closing of S4 flows through S7 to the solenoid RY10, actuating the switch S1 to step ahead to position 2.

This operation of stepping switch S1 causes wiper arm 141 of switch S1E to open circuit 140 leading to relay RY2i, thereby disconnecting the internal standard channel from amplifier input lead 30. The wiper arm 141 of switch S1E now closes with a second position contact connected by lead 185 to relay RY2s, energizing the latter and so connecting sample channel lead 22 to amplifier input lead 30, thereby applying the voltage on $C1_s$ in the second or unknown sample channel to the amplifier. At the same time, the wiper arms 125 and 104 of stepping switches S1C and S1B move to their second positions, selecting a second pair of sensitivity and zero control resistors R8 and R11 which are connected to the recorder and amplifier, respectively. Thus, the voltage on condenser $C1_s$ will be recorded in the same manner as the recordation of the voltage on $C1_i$, but using a different sensitivity and zero point if so desired. The zero point can, in fact, be placed off scale, and a high range of interest expanded over the full recorder scale by proper operation of the zero control and sensitivity control resistors.

Thus the voltage on $C1_s$ is applied to the amplifier, and after amplification, to the recorder, this taking place without perceptible discharge of the condenser. After a dwell, sufficient to allow the recorder pen to reach and dwell at the indicated reading (which may be a time period of one to two seconds), the selector stepping switch S1 will be pulsed by closure of recorder switch S4, as before, switch S1E moving to its third position, and sending current via a line 189 to relay RY2m. The voltage on the condenser in the third channel will then be recorded, again with different sensitivity and zero settings, if desired. If but a single sample channel is employed, of course, as in the simplified schematic showing here given, the third channel will be the monitor channel. However, in practice, there would normally be a multiplicity of channels, for the various elements to be determined, and corresponding successive recordings of the voltages on the several charged condensers.

The reading obtained on the recorder is related linearly to the voltage on the condenser, which is proportional to the total output of the phototube, and this in turn is proportional to the total intensity of the spectral line illuminating the phototube. The voltage on the condenser is also, of course, proportional to the time of charge. This time is controlled by the output of the internal standard phototube, so that the integrated intensities recorded are, in reality, integrated intensity ratios of the element lines to the internal standard line. By a proper calibration of these integrated intensities against samples of known concentration, recorder scales can be set up to read concentration percentages directly for each element to be analyzed, and such scales are conveniently and preferably printed or otherwise lettered directly on the strip chart paper (see Figure 7).

To automatically terminate the recording and reset for the next analysis, the following provisions are made:

A reset deck switch S1F on stepping switch S1 has wiper arm 190 movable over a set of contacts which include two contacts in addition to the number employed on the other switch decks, giving two positions beyond those employed on the other decks. Operable in conjunction with the switch S1F of the last mentioned switch deck is a double pole rotary manual switch S3 comprising two rotary switch arms 200 and 201 on a common shaft 202, these switch arms having a multiplicity of positions, in the present case three, as indicated. The first position contact of switch S1F is not used. The second position contact for switch arm 190 is connected by lead 203 to the first position contact of switch arm 200. The third position contact for switch arm 190 is connected by branching leads 204 and 205 to the first position contact and the second position contact for switch arms 201 and 200, respectively. The fourth position contact for switch arm 190 is connected by branching leads 206 and 207 to the second position contact and third position contact for switch arms 201 and 200, respectively. Finally, the fifth position contact for switch arm 190 is connected by lead 208 to the third position contact for switch arm 201.

The arms of switch S3 are manually moved to the position number which corresponds to the number of the last channel desired to be recorded prior to automatic reset. Then, when the arm 190 of stepping switch S1F reaches the first position beyond the position number of the last channel to be recorded, a series of automatic reset operations occur, to be followed, when switch S1F reaches its next position, by the completion of the automatic reset operations. Assuming, for example, that it should be desired to terminate integration and reset the system at the end of the second channel recording, that is to say, immediately after recording the charge on condenser C1s, switch arms 200 and 201 are moved to the second position contacts, as shown. Then, upon the switch arm 190 reaching position three, the following operations will then automatically occur. The 28-volt power in line 143 will flow via branch line 210 to arm 190 of switch S1F, thence through lead 205 to switch arm 200, and then via line 211 to energize and close relay RY22. This closes a circuit consisting of lead 212 from power line 164 to the release coil 213 of relay RY21, from there to the closed contacts of relay RY22 and from there via lead 214 to lead 161 going back to the other side 163 of the power line. Relay RY21, being already de-energized upon opening of recorder full scale switch S5, is accordingly released, and this has the effect of de-energizing relays RY3i, RY3s, and RY3m by breaking lead 220, said relays having previously been energized through the lower stationary and movable contact of relay RY21 from a lead 221 connected to a 28-volt power supply lead 143. De-energization of relays RY3 has the effect of connecting condensers C1i, etc., to ground through resistors R1, thus discharging them completely.

Unlocking of relay RY21 at the same time connects 28-volt lead 221 through the relay contacts to a lead 225 going to the coil of relay RY5, which closes its contacts to connect amplifier input lead 30 through resistor R3 to ground. The amplifier, as well as the storage condensers and the phototubes, are thus held at fixed ground potential at the reset and ready-to-operate position.

In addition, the unlocking of relay RY21 operates through its two upper contacts to connect conductor 145 to conductor 145a, the former leading to relay RY8, and the latter to the first position contact of switch S1D of selector switch S1. Relay RY8 is not yet energized, however, and will not be until the wiper arm 145b of switch S1D returns to its first position contact, and the automatic zero control circuit accordingly remains inactive until such event.

The above operations all occur upon the wiper arm 190 of switch S1F reaching its third position contact, with the arms of switch S3 at their second positions, as aforesaid. Upon reaching the fourth position contact, further reset operations occur as follows. The 28-volt power from lead 210 passes through switch arm 190 of switch S1F to the fourth position contact, thence via lead 206 to switch arm 201, and from there by way of leads 235, 235a and 236 to relay RY16, which thereupon closes. This closes a circuit consisting of lead 161 from power line 163, the contacts of relay RY16, the release coil 237 of relay RY15, and lead 167 back to power line lead 164. Relay RY15 is therefore released. The movable contact of RY15 accordingly separates from the relay contact connected to lead 39, thereby breaking the energizing lead 170 for the chart drive motor 68 from its connection with the live power circuit lead 163. At the same time, the movable contact of relay RY15 connected to lead 170 closes with a contact connected to a lead 240 connected to 28-volt direct current power supply lead 143, lead 240 including a filter such as the combination R17, R18, C5. The 28-volt direct current power is thus applied to the alternating current motor 68 of the recorder, which serves to brake said motor and to stop the same instantly. It is a fact familiar to those skilled in the art that the application of a direct current voltage to an alternating current motor will serve as an effective brake. The chart drive motor 68 of the recorder is thus instantly stopped. No further actuation of recorder pulse switch S4 will therefore occur, and the pulses which have been delivered to the stepping relay coil RY10 accordingly cease.

At the same time, the current in line 235a flows to the coil of relay RY14, causing its movable contact to separate from the stationary contact to which the stepping switch energizing lead 182 is connected, thereby disconnecting switch S7 and solenoid RY10 from lead 181 coming from RY13 which is energized by recorder pulse switch S4. The action of RY13 connects lead 181 to the 28-volt source lead 143. The energized line 235 also, through lead 240, energizes the coil of relay RY12, the circuit being completed to ground by way of lead 241, a stationary switch contact 242 of switch S1, and a notched, electrically grounded disk 243 or collector ring of switch S1. The disk 243 will be understood as occupying one of the levels on the shaft 105 of stepping switch S1, and it will be understood that this disk is fixed to and turns with shaft 105, step by step, in accordance with the ratchet action caused by intermittent energization of solenoid RY10. At one position in the periphery of disk 243 is a notch 245 giving clearance between stationary contact 242 and the disk 243. Notch 245 registers with stationary contact 242 in the first position of the stepping switch S1, i. e., the position of the common shaft 105 in which the various wiper arms of the switches S1B, S1C, etc., close with their first position contacts. At the time under consideration, the disk 243 will be at a position with notch 245 out of registration with contact 242, so that the circuit from lead 241 will be closed through contact 242, disk 243, and a grounding contact 246.

Energization of relay RY12 results in connecting 28-volt lead 210 through the lower stationary and movable contacts of relay RY12 to lead 235, the circuit continuing through lead 235a and branch lead 250 to the relay coil of RY14 and thence to ground. Relay RY12 thus locks itself closed, and its action also locks closed the relay RY14. This action of relay RY12 also sends the 28-volt power from lead 235 through wire 251 to a stationary relay contact then closed with the upper movable contact of the relay RY12, which is in turn connected by wire 252 to switch S7 of the selector switch. It should also be noted that the upper movable contact of relay RY12 has open circuited the switch shunting resistor R16. 28 volts of direct current power are accordingly continuously applied through switch S7 to stepping switch solenoid RY10. The result of this is that the solenoid RY10 continuously operates the stepping switch S1 until the various switches S1A, S1B, S1C, etc., have all been stepped back to the number one position illustrated in the diagram. This "homing" action results from the fact that at the end of each stroke of the solenoid, the switch S7 opens to allow the solenoid to return, the shunt holding resistor R16 being at this time open-circuited.

Arriving at the number one position the notch 245 in disk 243 opens the circuit by which the coil of relay RY12 is being energized, and the relay is accordingly de-energized, disconnecting the 28-volt power source from RY10. Opening of relay RY12 at the same time cuts off the power supply to relay RY14, and the latter is therefore simultaneously de-energized. Lead 181 is accordingly again connected to RY10 through switch S7, but since the chart drive motor has been stopped, no further pulses will be received. The rotary solenoid selector switch has accordingly been reset in its starting position.

The circuit connections and relays by which the source unit is connected and disconnected are as follows. A 230-volt line 11 is connected to the primary winding of a step-down transformer T, the secondary of which has connected thereto circuit leads 260 and 261 connected to the lower movable and stationary contacts of relay RY19, while in series with lead 261 is the coil of relay RY24. The two movable contacts of relay RY25 are connected across power main leads 11a and 11b by wires 262 and 263, respectively, and wire 263 is connected by wire 264 to the stationary contact of RY24, while the movable contact of the latter is connected by wire 265 to the coil of RY25. The other side of the coil of RY25 is connected by lead 266 to relay RY23, and from the latter the circuit continues via lead 267 to the stationary upper contacts of RY25. The lower stationary contact of RY25 is connected to lead 266. The upper stationary contact of RY25 is connected by lead 270 to one side of the source unit, and the other side of the latter is connected by lead 271 to lead 266. A starting switch S17 is placed in a lead 274 connected between wire 266 and the power line lead 11a.

In the reset and ready-to-operate position, relay RY19 is being energized through lead 150 going to normally-closed full-scale recorder switch S5 (being the switch automatically opened when the recorder pen reaches the high end of the scale), the circuit continuing thence via lead 142 and 143 to the 28-volt direct current power supply. Relay RY19 is accordingly energized, and its contacts have closed the circuit 260, 261. Relay RY24 is therefore also energized and closed. Operation of starting switch S17 sends power from power lead 11a through lead 274, relay RY25, wire 265, the contacts of relay 24, wire 264, and back to the other side 11b of the line by way of wire 263. The contacts of relay RY25 are therefore closed, connecting source unit input lead 270 to wire 263 and thence to one side of the power line, and connecting the other source unit lead 271 through the other set of relay contacts to wire 262 and so to the other side of the power line. The source unit is thus energized, and will remain energized until RY19 is de-energized upon the termination operation, as previously described, and which results in de-energization of relay RY24, opening the circuit to relay RY25, and thus disconnection of the source unit from the power mains.

The energization of relay RY21 upon starting of the source unit occurs as follows. Current flowing through starting switch S17 passes through wire 266, the coil of relay RY23, wire 267, contacts of relay RY25 and wire 263 to the opposite side of the line. Energization of relay RY23 then connects lead 280 from one side 163 of a 115-volt power line through the contacts of RY23 to lead 281, thence via branch lead 282 to the coil of RY21, and thence via wire 284 and lead 212 back to the other side 164 of the 115-volt power line. The coil of relay RY20 is energized through substantially the same circuit, being connected in parallel with the coil of RY21, as is apparent in the drawings. Starting of the source unit accordingly closes RY21, which remains locked closed by locking device 100, and at the same time closes the contacts of relay RY20, the latter action operating through lead 151 and the normally closed full scale recorder switch S5 to energize relays RY1, as already described.

Preferably, provisions are made for a manual reset to the ready-to-operate position. A double pole, double throw manual switch S13 is provided, one arm of which is connected by lead 290 to 115-volt power lead 163, and the other arm of which is connected by lead 291 to 28-volt power supply lead 156. The normal position of this switch S13 is closed with the contacts to which are connected leads 292 and 293, the first of which leads to the coils of relays RY4s and RY4m, and thence to ground. Lead 293 connects to the release coil for relay RY21, the circuit being completed by lead 212 connecting back to 115-volt power lead 164. Lead 293 however, contains a pair of contacts of normally-open double-pole manual reset switch S14, so that the circuit lead 293 is normally open. It will be seen that closure of reset switch S14, with switch S13 closed to the right hand pair of contacts, as viewed in Figure 1, results in release of relay RY21, and in the performance of the various previously described functions which occur upon release of said relay. Reset switch S14, when operated, also closes contacts in a circuit lead 156a between lead 225a and the 28-volt power line lead 156, which results in performance of the homing action of stepping selector switch S1, as previously described to occur under the control of the automatic reset switches. The system can accordingly be reset manually by operation of the reset switch S14.

Figure 7 shows a fragmentary portion of a strip chart record of a typical analysis of stainless steel by the system of the invention. The line 300 is the line traced by the recorder pen while the internal standard phototube $P_i$ is charging condenser $C1_i$ to full scale deflection of the recorder pen, the phototube $P_i$ being assumed to be operating under excitation by an iron line. The short vertical line 301 represents the dwell before the recorder switch S4 pulses the system ahead one step to connect the first condenser $C1_s$ to the amplifier to have its charge measured by the recorder. The slightly inclined pen line 302 represents the motion of the pen back to the position corresponding to the charge on this condenser $C1_s$, the incline resulting from the continuous drive of the strip chart; the short vertical line 303 then represents the dwell with the charge on $C1_s$ being recorded, prior to the next pulsing action by operation of S4. The chart represented in Figure 7 assumes the employment of four phototubes such as $P_s$, and four parallel channels leading to four storage condensers $C1_s$, as in a typical practical adaptation of the invention. The chart thus shows an analysis of stainless steel to include certain percentage concentrations of chromium, nickel, manganese and silicon. By making plots of concentrations of known samples vs. recorder readings, percentage scales can be set up from which the concentrations can be read directly, and such concentration scales are shown to be printed directly across the strip chart paper. It is obvious that these scales must be printed at spacings along the length of the paper strip in correlation with the advance of the strip for each operation of recorder pulsing switch S4, and also that the elements to be analyzed must appear in the channels of the system in the same order as they are printed on the strip chart paper.

Figure 7 also illustrates the record obtained when the zero point of the concentration scale is placed "off scale," with the range of interest expanded over the scale range on the paper. Thus the chromium scale begins with a concentration of 10% at the left hand edge of the strip chart, and ends with 20% at the right hand edge thereof. It will be recalled that the zero point of the scale is under the control of the resistors $R11$, while the sensitivity, or in other words, the proportionate part of the scale that will appear on the chart, depends upon the adjustment of the sensitivity control resistors R8 and attenuators R2.

Owing to changes in tube sensitivity, etc., the calibration of the system changes slowly over a period of time. Provision is made for recalibration, when required, as follows. Switch S13 is thrown to the left, as viewed in Figure 1, so as to de-energize relays RY4, and so that its lower switch arm closes with a circuit lead 320 leading to a relay RY18, and thence via lead 321 to power lead 164. The de-energization of relays RY4 acts to connect condensers $C2_s$ and $C2_m$ into the circuit in place of condensers $C1_s$ and $C1_m$. The energized relay RY18 is locked closed by relay lock 322. Energization of relay RY18 opens circuit 165, 166, preventing running of the chart drive motor 68 owing to the resulting impossibility of energizing RY15.

A standard sample with a known low concentration of a selected element is then run in the normal fashion, except that switch S13 is positioned to the left. The charge integration period is again under the control of the charging of $C1_1$ and the charge terminating function of the recorder at full scale deflection. In this run, condenser $C2_s$ will be charged instead of the condenser $C1_s$. Without recording this voltage, another run is then made with a high or larger known concentration of the element, the switch S13 at this time being positioned to the right, so that condenser $C1_s$ is charged. The selector relay is stepped to the channel to be calibrated, which can be accomplished by operation of manual switch S9. By then alternately energizing and de-energizing relay RY4 through operation of switch S13, the voltage on either condenser may be read on the recorder, and the zero and sensitivity controls adjusted until both samples read correctly on the calibrated concentration scale on the strip chart paper for the element in question. The system is then ready to continue analysis of unknown samples. When the source unit is again started, the previously described energization of relay RY23 will operate through its contacts, lead 281, the relay coil 330, for relay RY18, and lead 331, to energize coil 330 and so release the relay lock 332, so that relay RY18 goes back to its normal condition, with its contacts closed.

For some purposes, it is desired to read the instantaneous rather than the integrated intensity of a spectral line, and when this is the case, switch S16 is thrown to its alternate position, so as to energize lead 334 rather than the lead 220 going to the relay RY3. This lead 334 energizes a relay RY6, and its contacts connect a high resistance resistor R4 between amplifier input lead 30 and ground. The voltage developed across this resistor as a result of current flow from the phototube is impressed on the control grid of the amplifier tube 32. The system thus operates on instantaneous values of the output of the phototube, rather than on integrated totals obtained over a period of time.

The slit mounting and adjustment system has several unique features which will now be described. Each slit group is mounted in a rectangular frame 350 (Figures 3–5), which is located on and adjustable along the Rowland Circle (focal curve). The slits 13 and 14 are formed by spaced vertical bars 351 (Figures 4 and 5) furnished top and bottom with mounting blocks 352 which are slotted to slide along parallel mounting strips 353, being equipped with set screws 354 adapted to be set against said strips when the slit bars are in individually adjusted positions on the frames. The top part 359 of each frame is horizontally slotted at 360 to receive guide pins 361 projecting from a stationary mounting 362, and is provided with a central horizontal elongated slot 363 adapted to receive a shouldered guide screw 364 by which the frames are screwed to said mounting. Frame part 359 is also slotted at 370 to receive lug 371 projecting from mounting 362, said lug being equipped with a spring-pressed ball 372 adapted to bear against the adjacent surface of the slot to urge the frame to move in one direction on the guide pins 361 and screw 364. An eccentric 375 in a slot 376 in the top part 359 of frame 300 holds the frame against the pressure of the spring-pressed ball and adjustment of this eccentric by means of a shaft 378 rotatably mounted in mounting 362 and provided at the top with an operating knob 379 functions to adjust the entire frame in a horizontal direction along the focal curve. A mask 377 is preferably used to close the spaces between the pairs of slit bars.

Due to vibration and temperature changes, as well as aging in the frame parts of the machine, such a slit assembly will not stay in alinement with the spectral lines over long periods of time. In order to determine when misalinement has become sufficient to require correction, the monitor slit 14, phototube $P_m$, and relay channel leading to condenser $C_m$ have been provided. As already described, each slit 13 is originally individually adjusted so that the desired line falls through the center of the slit. The monitor slit 14, however, is so adjusted that the center of a strong line of an internal standard element coincides with the edge of the slit. Thus, referring to Figure 8, spectral lines 380 are alined with the centers of the slits 13, while the center of spectral line 381 is alined with one edge 382 of monitor slit 14. Thus a slight motion of the spectrum with respect to the slit frame gives a large change of intensity on the phototube $P_m$ corresponding with the monitor slit 14, and this intensity is used in the usual manner to charge up the condenser $Cl_m$, and is subsequently recorded on the strip chart paper, this reading coming, if desired, at the end of the run of the recording of the sample concentrations being analyzed. In practice, a .003" displacement of the slit 14 with respect to the spectral line 381 may give full scale recorder deflection. With the indicated slit widths, .001" represents the allowable deviation. By recording the intensity of the light falling through this monitor slit each time an analysis is made (or less often if the system is sufficiently stable) displacements of less than .0001" can be easily detected and the individual frames realined manually by operation of the adjustment knob 379, before misalinement becomes sufficiently serious to affect analytical accuracy. Referring again to the strip chart shown in Figure 7, the vertical recorder pen mark 400 represents the recording of the charge accumulated on the condenser charged by monitor phototube $P_m$ during a normal "run." This mark 400 will be seen to fall in this case close to the center chart line 5. Adjustments are so made that with zero misalinement of the monitor slit, the recorder pen mark would fall exactly on the center chart line 5. According to a present embodiment of the invention, the mark 400 would fall between chart lines 4 and 6 for tolerable misalinements, with any position in between these lines acceptable. In particular, in the present embodiment, the adjustments are such that slit misalinements of .0004" will throw the recorder line 400 as far off as chart lines 4 and 6. As already stated, a deviation of .001" is about the maximum that can be tolerated, so the system is kept on the safe side by maintaining the operation between lines 4 and 6.

The system preferably includes certain additional manual switches as follows: Switch S10, normally open, operates when closed to form a circuit from 28-volt power line 143 via lead 394 to the coil of relay RY7, said relay thereupon cutting out the automatic zero correction circuit for special test purposes. S11 and S12 are push switches connected into the system to manually start and stop the recorder chart drive motor for test purposes.

The invention has been heretofore described with the use of an internal standard line (e. g., an iron line in the case of an analysis of an alloy steel) for illumination of the phototube $P_i$ employed to charge the condenser $Cl_i$ up to the value at which the charge integration period is to be terminated. As an alternative, the primary reflected beam from the spectrograph grating may be used in place of the internal standard line. Figure 10 shows diagrammatically the sample excitation source, spark or arc, before source slit $t$, the spherical grating at $g$, and the so-called Rowland focal plane circle at R. In accordance with known principles, with the source slit $t$ located on the circle R, spectral images of slit $t$ will be formed in light of different wave lengths along the circle R. In accordance with the first described form of the invention, a slit such as 13 may be alined with an internal standard spectral line, and other slits 13 may be alined with other spectral lines of interest. Not all the light from source slit $t$ is dispersed by the grating, and there is accordingly a reflected, white light primary beam which forms an image on the Rowland circle, and this image line may be caused to fall on a slit such as M, and used as an internal standard line in place of an internal standard spectral line. Thus, the phototube $P_i$ of Figures 1 and 2 in such case receives light from a slit such as M receiving the white light image of the source slit $t$. It is found in practice that there is actually no necessity for focussing the reflected image to eliminate unwanted parts of the spectrum. Therefore, $P_i$ can, if desired, be placed much closer to the grating, it being only necessary that it be in the path of the reflected beam. Accordingly, we may use, for the purpose of the phototube $P_i$, either an internal standard spectral line, the internal standard line resulting from the primary reflected beam, or the reflected beam itself without bringing the latter first to an image.

The system preferably employs a strip chart recorder, as described, but instead of the recorder, a visual indicating meter, e. g., a voltmeter, may be employed. The type of recorder hereinbefore described, in fact, has a visual indicator scale and an indicator or pointer which travels with the recorder pen. While Figure 6 shows the rearward side of the recorder, and hence is not well adapted to illustration of the visual scale, the rearward side of the scale mounting plate appears in said figure at 410, and an indicator hand, moving with the recorder pen, at 411.

While we do not wish to be understood as limiting the invention, we may give the following circuit element constants as having been found successful in practice:

| | |
|---|---|
| C1—1 μfd. | R8—1000 ohms |
| C2—1 μfd. | R9—1000 ohms |
| C4—1 μfd. | R10—10000 megohms |
| C5—210 μfd. | R11—10000 ohms |
| R1—1000 ohms | R12—5000 ohms |
| R2—1 megohm | R13—250 ohms |
| R3—1000 ohms | R14—200 ohms |
| R4—20 megohms | R15—86000 ohms |
| R5—10000 ohms | R16—25 ohms |
| R6—13000 ohms | R17—25 ohms |
| R7—7000 ohms | R18—50 ohms |

The system now disclosed is of course for illustrative purposes only, and various changes in design, structure, and circuit arrangement can be made without departing from the spirit and scope of the invention as defined by the appended claims.

We claim:

1. In a spectrochemical analysis system, the combination of: a phototube adapted to receive light from a spectral line, a condenser, means for connecting said phototube to said condenser to charge said condenser during a charge integration period, a bridge thermionic amplifier including in one arm an amplifier tube having an input control grid and including in an opposed arm a second amplifier tube having a control grid, amplifier output leads connected across said bridge amplifier, a recorder connected to said output leads including an indicator movable along a scale having a zero position, automatic zero control means connected to the control grid of said second amplifier tube, said zero control means being operative in consonance with fluctuations of said indicator of said recorder from its zero position to change the voltage on said control grid in a manner to vary the amplifier output so as to return said indicator toward its zero position, means for rendering said automatic zero control means inoperative at the beginning of said charge integration period, and means operative at the end of said integration period for disconnecting the charged condenser from said phototube and connecting it to said control grid of said first mentioned amplifier tube.

2. In a spectrochemical analysis system, the combination of: a phototube adapted to receive light from a spectral line, a condenser, means for connecting said phototube to said condenser to charge said condenser during a charge integration period, a bridge thermionic amplifier including in one arm an amplifier tube having an input control grid and including in an opposed arm a second amplifier tube having a control grid, amplifier output leads connecting across said bridge amplifier, a recorder connected to said output leads, automatic zero control means connected to the control grid of said second amplifier tube to stabilize the output of said amplifier, means for rendering said automatic zero control means inoperative at the beginning of said charge integration period, and means operative at the end of said integration period for disconnecting the charged condenser from said phototube and connecting it to said control grid of said first-mentioned amplifier tube.

3. A combination as defined in claim 2, including also a voltage adjusting potentiometer connected in shunt across the amplifier output circuit.

4. In a spectrochemical analysis system, the combination, with a light dispersing system before a sample exciting light source, of: a first phototube arranged to receive light from said light source, a slit arranged in alinement with a spectral line of the spectrum formed by said light dispersing system, a second phototube arranged to receive light from said slit, first and second condensers, means for connecting said first and second phototubes to said first and second condensers, respectively, to be charged by said phototubes, a high impedance amplifier including an input amplifier tube with a control grid and having an output circuit, a strip chart pen recorder having input terminals connected across the output circuit of said amplifier and having a pen movable across a strip chart between zero and full scale positions in response to the voltage impressed across said input terminals, motor means for advancing said strip chart, a pulsing switch intermittently actuated by said motor means, an integration termination switch actuated by said recorder upon said recorder pen reaching full scale position, a solenoid-actuated multiple contact stepping switch actuated step-by-step by successive energizations of said solenoid, circuit means for energizing said solenoid upon actuation of said pulsing switch, first and second position contacts on said stepping switch, said stepping switch being initially closed with said first position contact, circuit means including said first position contact for connecting said first condenser to said control grid of said amplifier when said selector switch is closed with said first position contact, circuit means controlled by said integration termination switch of said recorder for disconnecting said condensers from said phototubes upon full scale deflection of said recorder pen, circuit means also controlled by said integration termination switch for operating said motor means for said strip chart, the solenoid of said stepping switch being actuated by said pulsing switch upon operation of said motor means, stepping said stepping switch to its second position contact, and circuit means including said second position contact of said stepping switch for connecting said second condenser to said control grid of said amplifier.

5. In a spectrochemical analysis system, the combination, with a light dispersing system before a sample exciting light source, of: a first phototube arranged to receive light from said light source, a slit arranged in alinement with a spectral line of the spectrum formed by said light dispersing system, a second phototube arranged to receive light from said slit, first and second condensers, means for connecting said first and second phototubes to said first and second condensers, respectively, to be charged by said phototubes, a high impedance amplifier including an input amplifier tube with a control grid and having an output circuit, a strip chart pen recorder having input terminals connected across the output circuit of said amplifier and having a pen movable across a strip chart between zero and full scale positions in response to the voltage impressed across said input terminals, motor means for advancing said strip chart, a pulsing switch intermittently actuated by said motor means, an integration termination switch actuated by said recorder upon said recorder pen reaching full scale position, a solenoid-actuated stepping selector switch including a plurality of ganged multiple-contact switches actuated step-by-step by successive energizations of said solenoid, circuit means for energizing said solenoid upon actuation of said pulsing switch, said multiple-contact switches including first and second position contacts, and being initially closed with said first position contacts, variable sensitivity control resistors adapted to be connected across the recorder input terminals, circuit means in connection with one of said multiple-contact switches for selecting different sensitivity control resistors at different switch positions and connecting the same across said recorder input terminals, circuit means including the first position contact of the other multiple contact switch for connecting said first condenser to said control grid of said amplifier when said other multiple contact switch is closed with its first position contact, circuit means controlled by said integration termination switch of said recorder for disconnecting said condensers from said phototubes upon full scale deflection of said recorder pen, circuit means also controlled by said integration termination switch for operating said motor means for said strip chart, the solenoid of said stepping switch being actuated by said pulsing switch upon operation of said motor means, stepping said stepping switch to its second position contacts, and circuit means including the second position contact of said other multiple contact switch for connecting said second condenser to said control grid of said amplifier.

6. In a spectrochemical analysis system, the combination, with a light dispersing system before a sample exciting light source, of: a first phototube arranged to receive light from said light source, a slit arranged in alinement with a spectral line of the spectrum formed by said light dispersing system, a second phototube arranged to receive light from said slit, first and second condensers, means for connecting said first and second phototubes to said first and second condensers, respectively, to be charged by said phototubes, a high impedance bridge amplifier including an input amplifier tube with a control grid in one arm and a second amplifier tube with a control grid in another arm, an amplifier output circuit connected across said bridge amplifier, a strip chart pen recorder having input terminals connected across the output circuit of said amplifier and having a pen movable across a strip chart between zero and full scale positions in response to the voltage impressed across said input terminals, motor means for advancing said strip chart, a pulsing switch intermittently actuated by said motor means, an integration termination switch actuated by said recorder upon said recorder pen reaching full scale position, a solenoid-actuated stepping selector switch including a plurality of ganged multiple-contact switches actuated step-by-step by successive energizations of said solenoid, circuit means for energizing said solenoid upon actuation of said pulsing switch, said multiple-contact switches including first and second position contacts, and being initially closed with said first position contacts, variable sensitivity control resistors adapted to be connected across the recorder input terminals, circuit means in connection with one of said multiple-contact switches for selecting different sensitivity control resistors at different switch positions and connecting the same across said recorder input terminals, a zero control circuit for said bridge amplifier connected to the control grid for its second amplifier tube, said circuit including a source of voltage and a plurality of selective variable zero control resistors adapted to adjust the voltage applied to said control grid of said second tube, circuit means in connection with the second of said multiple-contact switches for selecting different zero control resistors at different switch positions and connecting the same into the zero control circuit, circuit means including the first position contact of another of said multiple contact switches for connecting said first condenser to the control grid of the first mentioned amplifier tube when said last mentioned multiple contact switch is closed with its first position contact, circuit means controlled by said integration termination switch of said recorder for disconnecting said condensers from said phototubes upon full scale deflection of said recorder pen, circuit means also controlled by said integration termination switch for operating said motor means for said strip chart, the solenoid of said stepping switch being actuated by said pulsing switch upon operation of said motor means, stepping said stepping switch to its second position contacts, and circuit means including the second position contact of the last mentioned multiple contact switch for connecting said second condenser to said control grid of said input amplifier tube.

7. In a spectrochemical analysis system, the combination, with a light dispersing system before a sample exciting light source, of: a first phototube arranged to receive internal standard light from said light source, a slit arranged in alinement with a spectral line of the spectrum formed by said light dispersing system, a phototube arranged to receive light passing through said slit, a condenser to be charged by the first mentioned phototube, a pair of condensers to be charge alternately by the second mentioned phototube, a high impedance amplifier having input and output circuits, a recorder connected across said amplifier output circuit, a recorder sensitivity control potentiometer shunted across said amplifier output circuit, means for connecting the first mentioned condenser and one condenser of said pair to the corresponding phototubes to be charged thereby during a charging period, means for connecting said first mentioned condenser and the other condenser of said pair to the corresponding phototubes to be charged thereby during a second charging period, means for connecting the first mentioned condenser to the amplifier input circuit during each of said charging periods, means for terminating said charging periods upon said recorder recording a predetermined charge accumulated on said first mentioned condenser, means for thereupon disconnecting said first mentioned condenser from said amplifier following said charging periods, and means for thereafter connecting the individual condensers of said condenser pair alternately to said amplifier input circuit.

8. In a spectrochemical analysis system, having a focal plane in which spectral lines are formed, the combination of: a slit frame positioned in said focal plane, said frame having a plurality of slits spaced to receive light from a plurality of spectral lines, said slits including a plurality of slits spaced on said frame to be substantially centered with said lines, and including also a monitor slit positioned on said frame with one of its edges between the edges of its spectral line, means for adjusting the position of said frame and slits as a unit along the focal plane, phototubes receiving the light from said slits, condensers and circuit means for connecting said condensers to respective phototubes, and means for recording the charges accumulated on said condensers during a common integration period.

9. In a spectrochemical analysis system, having a focal plane in which spectral lines are formed, the combination of: a slit frame positioned in said focal plane, said frame having a plurality of slits spaced to receive light from a plurality of spectral lines, said slits including a plurality of slits spaced on said frame to be substantially centered with said lines, and including also a monitor slit positioned on said frame with one of its edges between the edges of its spectral line, means for adjusting the position of the frame and slits as a unit along the focal plane, phototubes receiving light from the slits, and means for detecting lateral travel between the spectral lines and slit frame in accordance with changes in intensity of the light reaching the phototube associated with said monitor slit.

10. In a spectrochemical analysis system, the combination, with a light dispersing system before a sample exciting light source, of: a first phototube arranged to receive internal standard light from said light source, a sample analysis slit arranged in alinement with a spectral line of the spectrum formed by an element of unknown concentration in the sample, a monitor slit arranged with one edge between the edges of an internal standard spectral line of said spectrum, a slit frame supporting both of said slits arranged for adjustment movement along said spectrum, phototubes arranged to receive light passing through said slits, a condenser for each of said slits to be charged thereby, an amplifier having input and output circuits, said amplifier having an ultra high input impedance, whereby it may be connected to the condensers without perceptibly discharging the condensers, a recorder connected across the amplifier output circuit, means for connecting the condensers to respective phototubes to be charged thereby during a charging period, means for connecting the condenser corresponding to the first mentioned phototube across the input circuit of said amplifier, means for terminating said charging period upon said recorder recording a predetermined charge on said condenser which is connected to the amplifier during the charging period, and for disconnecting said condenser from said amplifier, and means for thereafter consecutively connecting the remaining condensers to said amplifier to have their charges consecutively recorded by said recorder.

11. In a spectrochemical analysis system, the combination of: a bank of detecting devices arranged to receive electromagnetic spectral beam radiation corresponding to a plurality of unknown elements in an energized sample, said detecting devices being adapted to deliver output currents responsive to the quantity of radiation received thereby, a corresponding bank of charge integration condensers, circuits for conducting the output currents of said detecting devices to respective condensers to accumulate electric charge thereon corresponding directly to the integrated radiation received by said detecting devices during a common charge integration period, normally open switch means in connection with said circuits operable to close said circuits from said detecting devices to said condensers at the beginning of said charge integration period, and to open said circuits at the termination of said charge integration period, an amplifier having input and output circuits, said amplifier having an ultra high input impedance, whereby it may be connected to the condensers without perceptibly discharging the condensers step-by-step switch and circuit means for consecutively and intermittently connecting said condensers to said input circuit of said amplifier after the termination of said charge integration period, and a recording instrument connected to the output circuit of said amplifier, said recorder including means coordinated with said step-by-step means for making consecutive recordings representative of charges borne by said condensers during periods of rest of said step-by-step means.

12. In a spectrochemical analysis system, the combination of: a bank of detecting devices arranged to receive electromagnetic spectral beam radiation corresponding to a plurality of unknown elements in an energized sample, said detecting devices being adapted to deliver output currents responsive to the quantity of radiation received thereby, a corresponding bank of charge integration condensers, circuits for conducting the output currents of said detecting devices to respective condensers to accumulate electric charge thereon corresponding directly to the integrated radiation received by said detecting devices during a common charge integration period, normally open switch means in connection with said circuits operable to close said circuits from said detecting devices to said condensers at the beginning of said charge integration period, and to open said circuits at the termination of said charge integration period, an amplifier having input and output circuits, said amplifier having an ultra high input impedance, whereby it may be connected to the condensers without perceptibly discharging the condensers, step-by-step switch and circuit means for connecting one of said condensers to said input circuit of said amplifier throughout said charge integration period, and operable automatically upon attainment of a predetermined charge to disconnect said one of said condensers from said amplifier input circuit and to consecutively and intermittently connect the remainder of said condensers to said amplifier input circuit, and a recording instrument connected to the output circuit of said amplifier, said recorder including means coordinated with said step-by-step means for making consecutive recordings representative of charges borne by said condensers during periods of rest of said step-by-step means.

13. In a spectrochemical analysis system, the combination, with a light dispersing system before a sample exciting light source, of: a first phototube arranged to receive light from said light source, a slit arranged in alinement with a spectral line of the spectrum formed by said light dispersing system, a second phototube arranged to receive light from said slit, first and second condensers, means for connecting said first and second phototubes to said first and second condensers, respectively, to be charged by said phototubes, an amplifier including an input circuit and an output circuit, said amplifier having an ultra high input impedance, whereby it may be connected to the condensers without perceptibly discharging the condensers a recording instrument connected to the output circuit of said amplifier, a solenoid-actuated multiple contact stepping switch, circuit means for energizing said solenoid including a pulsing switch, first and second position contacts on said stepping switch, said stepping switch being initially closed with said first position contact, circuit means including said first position contact for connecting said first condenser to said input circuit of said amplifier when said selector switch is closed with said first position contact, and circuit means operable after the termination of a predetermined condenser charging period for disconnecting said condensers from said phototubes and for actuating said pulsing switch to energize said solenoid.

14. In a spectrochemical analysis system, the combination, with a spectrum forming light dispersing system positioned before a sample exciting light source, of: a first photoelectric device arranged to receive a quantity of internal standard light from said light source proportionate to the intensity of said source while a sample is being excited, a light slit arranged in alinement with a spectral line of said spectrum corresponding to an element of unknown concentration in the sample, a second photoelectric device arranged to receive light from said slit, first and second charge storage condensers, means for connecting said first and second condensers to said first and second photoelectric devices, respectively, to be charged thereby during a controlled common charge integration period, a voltage amplifier of ultra high input impedance adapted to be connected consecutively across said condensers and to amplify the voltages to which said condensers are charged by said photoelectric devices without perceptibly discharging the condensers, a strip chart voltage recorder for recording voltage output from said amplifier, said recorder having a recording element movable transversely across a longitudinally movable strip chart between zero and full scale position in response to amplitude of amplifier output voltage impressed thereon, condenser switching means and circuiting of ultra high shunt impedance for connecting the input end of said ultra high impedance amplifier across said first condenser throughout said charge integration period, means arresting the charging of said condensers to terminate said charge integration period coincidently with full scale deflection of said recorder element, and said condenser switching means and circuiting including means operable upon termination of the charge integration period to disconnect said amplifier from said first condenser and to connect it across said second condenser.

15. In a spectrochemical analysis system, the combination, with a spectrum forming light dispersing system positioned before a sample exciting light source, of: a first photoelectric device arranged to receive a quantity of internal standard light from said light source proportionate to the intensity of said source while a sample is being excited, a light slit arranged in alinement with a spectral line of said spectrum corresponding to an element of unknown concentration in the sample, a second photoelectric device arranged to receive light from said slit, first and second charge storage condensers, means for connecting said first and second condensers to said first and second photoelectric devices, respectively, to be charged thereby during a controlled common charge integration period, an amplifier adapted to be connected consecutively across said condensers, said amplifier having an ultra high input impedance, so as to avoid perceptible discharge of the condensers, a strip chart recorder for recording the output from said amplifier, said recorder having a recording element movable transversely across a longitudinally movable strip chart between zero and full scale position in response to the amplitude of the output of said amplifier, condenser switching means and circuiting of ultra high shunt impedance for connecting the input end of said ultra high impedance amplifier across said first condenser throughout said charge integration period, means arresting the charging of said condensers to terminate said charge integration period coincidently with full scale deflection of said recorder element, and said condenser switching means and circuiting including means operable upon termination of the charge integration period to disconnect said amplifier from said first condenser and to connect it across said second condenser.

16. The subject matter of claim 15, wherein the internal standard light is a spectral line of an element of known concentration within the sample.

17. The subject matter of claim 15, wherein the light dispersing means is a reflective grating and the internal standard light is the primary reflected beam from the grating.

18. The subject matter of claim 15, wherein the means arresting the charging of the condensers to terminate the charging of the condensers includes switching means operated by the strip chart recorder at full scale deflection of the recorder element.

19. The subject matter of claim 18, wherein the means operable upon termination of the charge integration period to disconnect the amplifier from the first condenser and connect it across the second condenser includes switching means operated by the strip chart recorder at full scale deflection of the recorder element.

20. In a spectrochemical analysis system, the combination, with a spectrum forming radiation dispersing system positioned before a sample excited by a source of electromagnetic radiations, of: a first detecting device arranged to receive a quantity of internal standard radiation from said source proportionate to the intensity of said source while a sample is being excited, a bank of detecting devices arranged to receive spectral lines of said spectrum corresponding to elements of unknown concentration in the sample, said detecting devices being adapted to deliver output currents responsive to the quantity of radiation received thereby, a plurality of slit means combined with said dispersing system for controlling the radiation transmitted by the dispersing system to the individual detecting devices, a first storage condenser and a bank of storage condensers, means for connecting said first storage condenser across the first detecting device and the bank of condensers across respective members of said bank of detecting devices during a common charge integration period, an amplifier adapted to be connected consecutively across successive condensers, said amplifier having an ultra high input impedance, so as to avoid perceptible discharge of the condensers, a strip chart recorder for recording the output from said amplifier, said recorder having a recording element movable transversely across a longitudinally movable strip chart between zero and full scale position in response to the amplitude of the output of said amplifier, means arresting the charging of the condensers to terminate said charge integration period upon the charge stored in said first condenser attaining a predetermined value, and step-by-step condenser switching means and circuiting of ultra high shunt impedance operable upon termination of said charge integration period to connect said amplifier across each of the condensers of said bank of condensers in turn.

21. In a spectrochemical analysis system, the combination, with a spectrum forming radiation dispersing system positioned before a sample excited by a source of electromagnetic radiations, of: a first detecting device arranged to receive a quantity of internal standard light from said light source proportionate to the intensity of said source while a sample is being excited, a bank of detecting devices arranged to receive spectral lines of said spectrum corresponding to elements of unknown concentration in the sample, said detecting devices being adapted to deliver output currents responsive to the quantity of radiation received thereby, a plurality of slit means combined with said dispersing system for controlling the radiation transmitted by the dispersing system to the individual detecting devices, a first storage condenser and a bank of storage condensers, means for connecting said first storage condenser across the first detecting device and the bank of condensers across respective members of said bank of detecting devices during a common charge integration period, an amplifier adapted to be connected consecutively across successive condensers, said amplifier having an ultra high input impedance so as to avoid perceptible discharge of the condensers, a recorder for recording output from said amplifier while said amplifier is connected to successive condensers of said bank, means arresting the charging of the condensers to terminate said charge integration period upon the charge stored in said first condenser attaining a predetermined value, and step-by-step condenser switching means and circuiting of ultra high shunt impedance operable upon termination of said charge integration period to connect said amplifier across each of the condensers of said bank of condensers in turn.

22. In a spectrochemical analysis system, the combination, with a spectrum forming radiation dispersing system positioned before a sample excited by a source of electromagnetic radiations, of: a first detecting device arranged to receive a quantity of internal standard radiation from said source proportionate to the intensity of said source while a sample is being excited, a bank of detecting devices arranged to receive spectral lines of said spectrum corresponding to elements of unknown concentration in the sample, said detecting devices being adapted to deliver output currents responsive to the quantity of radiation received thereby, a plurality of slit means combined with said dispersing system for controlling the radiation transmitted by the dispersing system to the individual detecting devices, a bank of storage condensers, means for connecting the bank of storage condensers across respective members of said bank of detecting devices during a common charge integration period, an amplifier adapted to be connected consecutively across successive condensers, said amplifier having an ultra high input impedance, so as to avoid perceptible discharge of the condensers, a strip chart recorder for recording the output from said amplifier, said recorder having a recording element movable transversely across a longitudinally movable strip chart between zero and full scale position in response to the amplitude of the output of said amplifier, means responsive to and operable by virtue of attainment of a predetermined integrated output from said first detecting device for arresting the charging of said condensers, and step-by-step condenser switching means and circuiting of ultra high shunt impedance operable upon termination of said charge integration period to connect said amplifier across each of the condensers of said bank of condensers in turn.

23. In a spectrochemical analysis system, the combination, with a spectrum forming radiation dispersing system positioned before a sample excited by a source of electromagnetic radiations, of: a first detecting device arranged to receive a quantity of internal standard radiation detecting from said source proportionate to the intensity of said source while a sample is being exicted, a bank of detecting devices arranged to receive spectral lines of said spectrum corresponding to elements of unknown concentration in the sample, said detecting devices being adapted to deliver output current responsive to the quantity of radiation received thereby, a plurality of slit means combined with said dispersing system for controlling the radiation transmitted by the dispersing system to the individual detecting devices, a bank of storage condensers, means for connecting the bank of storage condensers across respective members of said bank of detecting devices during a common charge integration period, an amplifier adapted to be connected consecutively across successive condensers, said amplifier having an ultra high input impedance, so as to avoid perceptible discharge of the condensers, a recorder for recording output from said amplifier while said amplifier is connected to successive condensers of said bank, means responsive to and operable by virtue of attainment of a predetermined integrated output from said first detecting device for arresting the charging of said condensers, and step-by-step condenser switching means and circuiting of ultra high shunt impedance operable upon termination of said charge integration period to connect said amplifier across each of the condensers of said bank of condensers in turn.

24. In a spectrochemical analysis system, the combination, with a spectrum forming radiation dispersing system positioned before a sample excited by a source of electromagnetic radiations, of: a first detecting device arranged to receive a quantity of internal standard radiation from said source proportionate to the intensity of said source while a sample is being excited, a bank of detecting devices arranged to receive spectral lines of said spectrum corresponding to elements of unknown concentration in the sample, said detecting devices being adapted to deliver output currents responsive to the quantity of radiation received thereby, a plurality of slit means combined with said dispersing system for controlling the radiation transmitted by the dispersing system to the individual detecting devices, a first storage condenser and a bank of storage condensers, means for connecting said first storage condenser across the first detecting device and the bank of condensers across respective members of said bank of detecting devices during a common charge integration period, an amplifier adapted to be connected consecutively across successive condensers, said amplifier having an ultra high input impedance, so as to avoid perceptible discharge of the condensers, a strip chart recorder for recording the output from said amplifier, said recorder having a recording element movable transversely across a longitudinally movable strip chart between zero and full scale position in response to the amplitude of the output of said amplifier, condenser switching means and circuiting of ultra high shunt impedance for connecting the input end of said ultra high impedance amplifier across said first condenser throughout said charge integration period, means arresting the charging of said condensers to terminate said charge integration period coincidently with full scale deflection of said recorder element, and said condenser switching means and circuiting including step-by-step means operable upon termination of said charge integration period to disconnect said amplifier from said first condenser and to connect it to each of the condensers of said bank in turn.

25. In a spectrochemical analysis system, the combination, with a spectrum forming radiation dispersing system positioned before a sample excited by a source of electromagnetic radiations, of: a first detecting device arranged to receive a quantity of internal standard radiation from said source proportionate to the intensity of said source while a sample is being excited, a bank of detecting devices arranged to receive spectral lines of said spectrum corresponding to elements of unknown concentration in the sample, said detecting devices being adapted to deliver output currents responsive to the quantity of radiation received thereby, a plurality of slit means combined with said dispersing system for controlling the radiation transmitted by the dispersing system to the individual detecting devices, a first storage condenser and a bank of storage condensers, means for connecting said first storage condenser across the first detecting device and the bank of condensers across respective members of said bank of detecting devices during a common charge integration period, a voltage amplifier adapted to be connected consecutively across successive condensers, said amplifier having an ultra high input impedance, so as to avoid perceptible discharge of the condensers, a recorder for recording output voltage from said amplifier, circuit means including a source of d.-c. voltage and a plurality of selective adjustable potentiometers for impressing on the amplifier-recorder combination an adjusted bucking voltage which adjusts the voltage impressed on the recorder, a plurality of selective variable sensitivity control resistors connectible across the output terminals of the amplifier, means arresting the charging of the condensers to terminate said charge integration period upon the charge stored in said first condenser attaining a predetermined value, and step-by-step switching means and circuiting, including a circuit of ultra high shunt impedance connecting said amplifier across said first condenser throughout the charge integration period, said switching means operable following the termination of said charge integration period to switch said amplifier step-by-step across the condensers of said bank of condensers, and said switching means and circuiting including means also operable by its step-by-step action to switch said selective potentiometers successively into circuit, and including additional means operable by said step-by-step action to switch said variable sensitivity control resistors successively across the amplifier output circuit.

References Cited in the file of this patent

UNITED STATES PATENTS

| Number | Name | Date |
|---|---|---|
| 1,964,454 | Cockrell et al. | June 26, 1934 |
| 2,360,883 | Metcalf | Oct. 24, 1944 |
| 2,447,024 | Metcalf | Aug. 17, 1948 |
| 2,481,485 | Stanton | Sept. 13, 1949 |
| 2,577,814 | Saunderson et al. | Dec. 11, 1951 |